United States Patent
Kunde

Patent Number: 5,808,016
Date of Patent: Sep. 15, 1998

[54] DISAZO DYESTUFFS

[75] Inventor: Klaus Kunde, Neunkirchen, Germany

[73] Assignee: Bayer Aktiengesellschaft, Leverkusen, Germany

[21] Appl. No.: 932,836

[22] Filed: Sep. 17, 1997

[30] Foreign Application Priority Data

Sep. 23, 1996 [DE] Germany .......................... 19638890.2

[51] Int. Cl.⁶ .............. C09B 35/04; D06P 1/39; D21H 21/28

[52] U.S. Cl. .......... 534/819; 534/829; 534/835; 534/588; 8/681; 8/687; 8/918; 8/919

[58] Field of Search .................. 534/819, 829, 534/835, 588; 8/687, 918, 919

[56] References Cited

U.S. PATENT DOCUMENTS 4,988,805  1/1991  Kunde ..................................... 534/717
5,288,294  2/1994  Käser ..................................... 8/687

FOREIGN PATENT DOCUMENTS 0 301 350 A 2  2/1989  European Pat. Off. .
0 534 903 A 1  3/1993  European Pat. Off. .

*Primary Examiner*—Fiona T. Powers
*Attorney, Agent, or Firm*—Sprung Kramer Schaeffer & Briscoe

[57] ABSTRACT

The novel disazo dyestuffs of the formula (I)

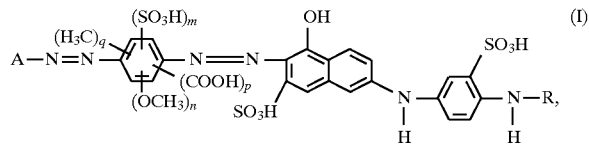

in which the substituents and indices have the meaning given in the description, are outstandingly suitable for dyeing cellulosic materials, in particular paper, and are distinguished by good fastness properties.

9 Claims, No Drawings

DISAZO DYESTUFFS

The present invention relates to novel disazo dyestuffs, processes for their preparation and their use for dyeing cellulosic materials.

The novel disazo dyestuffs correspond to the general formula I

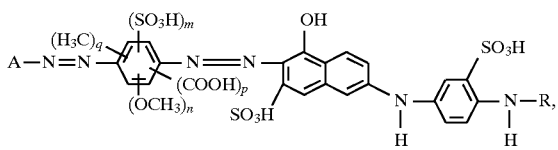

in which
A represents a radical of the formula

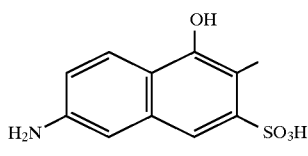

or

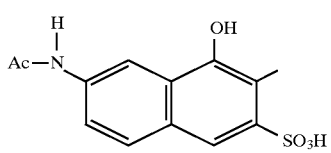

in which

Ac represents an acetyl or propionyl radical or a benzoyl radical which is optionally substituted by CH$_3$, CH$_3$O or COOH,
m, n, p and q represent 0 or 1 and
m+p=1, and
R represents hydrogen or a benzoyl radical which is optionally substituted by CH$_3$, CH$_3$O or COOH, with the proviso that R≠hydrogen if m=1 and n=0 and q=0.

Preferred dyestuffs of the formulae (I) are those in which A represents a radical of the formula

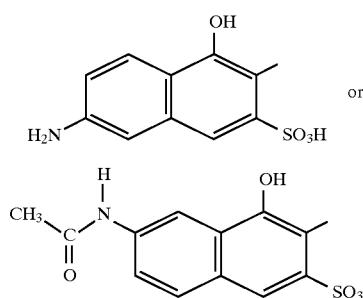

In the context of the formula (I), particularly preferred dyestuffs are those of the formulae

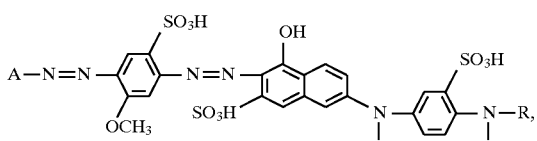

and

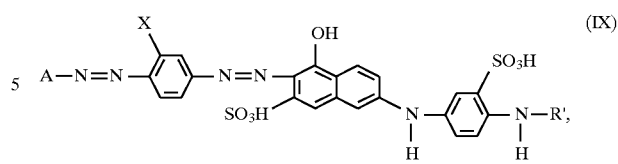

in which

A represents a radical of the formula (II) or (VII) and
X represents SO$_3$H or COOH,
R' represents a benzoyl radical which is optionally substituted by CH$_3$, CH$_3$O or COOH and
R has the abovementioned meaning.

Dyestuffs of the formulae (VIII) and (IX) which are of particular interest are those in which A represents a radical of the formula (II) or (VII),
X represents SO$_3$H or COOH and
R represents COC$_6$H$_5$.

The novel dyestuffs of the formula (I) can be prepared in a manner known per se, by coupling the compound of the general formula (IV)

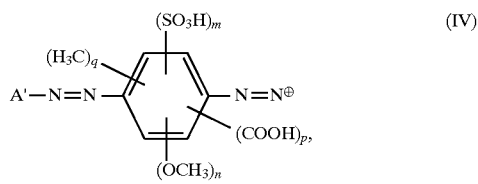

in which A' represents a radical of the formula

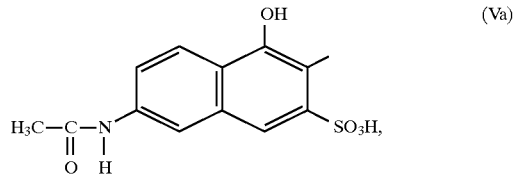

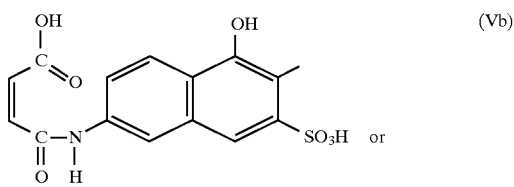

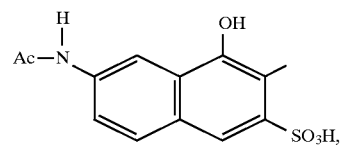

in which

Ac has the abovementioned meaning and
m, n, p and q have the abovementioned meaning,
with a compound of the formula (VI)

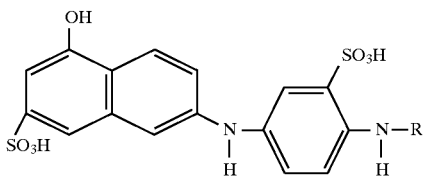

in which

R has the meaning given above, and then splitting off the maleyl radical or acetyl radical selectively.

The diazonium compounds of the formula (IV) can be obtained by reducing the compounds of the general formula (X)

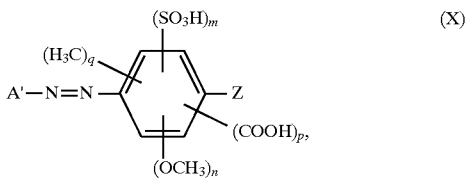

in which z represents $NO_2$ and
A', m, n, p and q have the abovementioned meaning,
with sodium sulfide in a manner known per se to give the amino compounds of the general formula (XI)

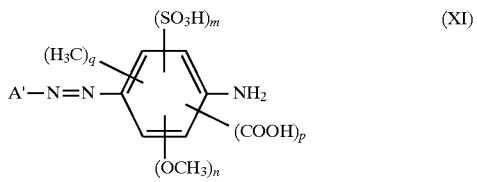

in which

A', m, n, p and q have the abovementioned meaning, or hydrolyzing compounds of the formula (X), in which Z represents $NHCOCH_3$ or $NHCOCH=CHCOOH$, in a manner known per se, optionally selectively, to give the amino compounds of the formula (XI) and diazotizing these in a manner known per se.

The coupling component of the formula (VI) where R=hydrogen is known; it can be acylated with benzoyl chloride, which is optionally substituted by $CH_3$, $OCH_3$ or COCl, in a manner known per se in aqueous solution at pH values between 3 and 10, preferably between 5 and 8, at temperatures between 0° and 50° C., preferably between 10° and 40° C.

The coupling of the diazonium compounds of the formula (IV) with the compounds of the formula (VI) is preferably carried out in an aqueous or aqueous-organic medium, preferably in water, in solution or suspension at 0° to 40° C., preferably at 5° to 20° C., at pH values between 7 and 10, preferably between 8.5 and 9.5; the selective splitting off of the maleyl radical is carried out at temperatures between 60° and 105° C., preferably between 70° and 90° C., at pH values between 2 and 4, preferably between 2.5 and 3.5, and the splitting off of the acetyl radical is carried out at temperatures between 60° and 105° C., preferably between 70° and 90° C., at pH values between 10 and 13, preferably between 11 and 12.

The dyestuffs dye cellulosic materials, in particular paper, cotton and viscose, as well as leather, in blue shades, with good fastnesses to wet processing and light.

The dyestuffs can be used by all the processes customary for substantive dyestuffs in the paper and textile industry, in particular in the pulp and in the surface dyeing of paper for sized and unsized grades, starting from bleached or unbleached cellulose of various origins, such as softwood or hardwood sulfite and/or sulfate cellulose. They can also be used in the dyeing of yarn or piece goods of cotton, viscose and linen by the exhaust process from a long liquor or in continuous processes.

The dyeings on paper obtained with the dyestuffs according to the invention are distinguished by good fastness to light and wet processing (fastness to bleeding) as well as fastness to acids, alkalis and alum. The brilliance and clarity of the color shades is also notable. The combination properties with suitable dyestuffs are furthermore very good.

For dyeing paper in the pulp, the dyestuffs can be added to the paper pulp before sheet formation, either to the thick matter after breaking down the cellulose or to the thin matter before feeding to the papermaking machine. For the preparation of paper sized in the pulp, they are preferably added to the thin matter before addition of the sizing agent.

In the case of surface dyeing, the dyestuff is applied after sheet formation. This is preferably effected in the size press, by dissolving the dyestuff in a concentrated starch solution and applying it in this form to the paper.

The dyestuffs of the formula (I) can be employed as solid dyestuff preparations, preferably as powders or granules, which optionally comprise customary additives, such as, for example, ionic or nonionic formulating agents and/or dust removal agents.

The use of liquid preparations, in particular the use of concentrated aqueous solutions, which are preferably free from organic solubilizing agents and comprise at least one dyestuff of the general formula (I), is preferred for the process according to the invention. The liquid dyestuff preparations in general comprise 10 to 40% by weight, preferably 20 to 40% by weight, of at least one dyestuff of the formula (I), based on the finished preparation.

EXAMPLE 1

28.4 g of 5-amino-4-methoxy-2-nitrobenzenesulfonic acid are diazotized in 300 ml of water at a pH of 1.5 and a temperature of 30° C. 28.1 g of 6-acetylamino-4-hydroxy-2-naphthalenesulfonic acid are added to this suspension. The pH of the suspension is brought to and maintained at 3 with sodium carbonate solution. When the coupling has ended, the batch is neutralized and 25 g of sodium sulfide, technical grade (60%) are added at a temperature of 60° C. When the reduction has ended, the aminoazo compound is precipitated out by addition of salt and isolated $\lambda_{max}$=553 nm).

EXAMPLE 2

40.0 g of 4-hydroxy-7-(4'-amino-3'-sulfophenylamino)-2-naphthatenesulfonic acid are dissolved in 500 ml of water with sodium carbonate solution at 25° C. and a pH of 6, and 17.5 g of benzoyl chloride are then added dropwise, the pH being kept constant with sodium carbonate solution. The condensation product corresponds to the following formula

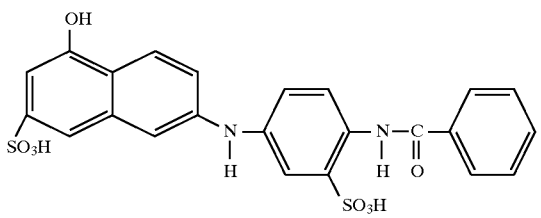

EXAMPLE 3

57.6 g of the amino compound from Example 1 are diazotized in 500 ml of water at a pH of 1.5 and a temperature of 30° C. This diazonium compound is added dropwise at a temperature of 25° C. to a solution of 50.4 g of the condensation product from Example 2, the pH being kept at 7 with sodium carbonate solution. When the coupling has ended, the dyestuff is precipitated out with salt, isolated and dried. It corresponds to the following formula

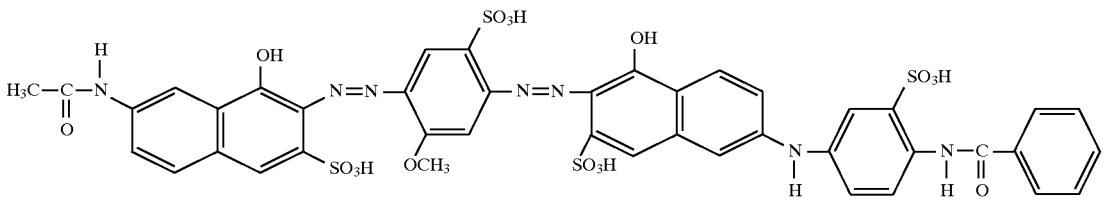

$\lambda_{max}$ = 633 nm

EXAMPLE 4

28.4 g of 5-amino-4-methoxy-2-nitrobenzenesulfonic acid are diazotized in 300 ml of water at a pH of 1.5 and a temperature of 30° C. 28.1 g of 7-acetylamino-4-hydroxy-2-naphthalenesulfonic acid are added to this suspension. The pH of the suspension is brought to and kept at 3 with sodium carbonate solution. When the coupling has ended, 25 g of sodium sulfide, technical grade (60%) are added at a temperature of 60° C. When the reduction has ended, the aminoazo compound is precipitated out by addition of salt and isolated.

57.6 g of this aminoazo compound are diazotized in 500 ml of water at a pH of 1.5 and a temperature of 30° C. This diazonium compound is added dropwise at a temperature of 25° C. to a solution of 40.0 g of 4-hydroxy-7-(4'-amino-3'-sulfo-phenylamino)-2-naphthalenesulfonic acid in 300 ml of water, the pH being kept at 7 with sodium carbonate solution. When the coupling has ended, 40 g of sodium hydroxide are added and the acetyl radical is then split off at a temperature of 90° C. The dyestuff is precipitated out by addition of salt, isolated and dried. It corresponds to the following formula

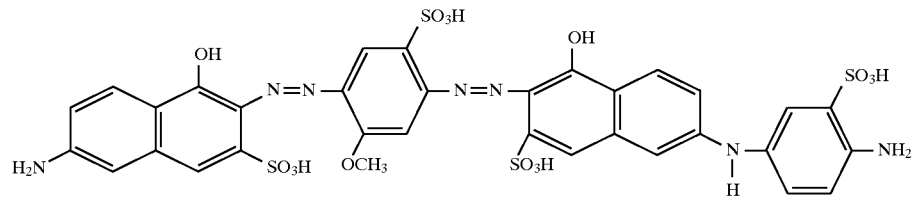

$\lambda_{max}$ = 621 nm

EXAMPLE 5

18.2 g of 5-nitro-2-aminobenzoic acid are diazotized in 300 ml of water at a pH of 1.5 and a temperature of 30° C. 33.7 g of 7-maleylamino-4-hydroxy-2-naphthalene-sulfonic acid are added to this suspension. The pH of the suspension is brought to and kept at 3 with sodium acetate. When the coupling has ended, the batch is neutralized and 25 g of sodium sulfide, technical grade (60%) are then added at a temperature of 60° C. When the reduction has ended, the aminoazo compound is precipitated out by addition of salt and isolated.

50.2 g of this aminoazo compound are diazotized in 500 ml of water at a pH of 1.5 and a temperature of 30° C. This diazonium compound is added dropwise to a solution of 50.4 g of the condensation product from Example 2 at a temperature of 25° C., the pH being kept at 7.5 with sodium carbonate solution. When the coupling has ended, the batch is heated to 90° C. and the pH is then brought to 3 with hydrochloric acid and kept at this level until the splitting off of the maleyl radical has ended. The dyestuff is precipitated out with salt, isolated and dried. It corresponds to the following formula following table.

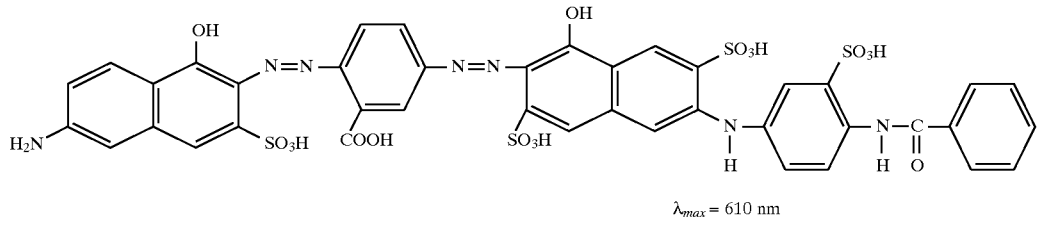

$\lambda_{max}$ = 610 nm

Further dyestuffs which were prepared analogously to the processes described in Examples 3, 4 and 5 are listed in the following table.

TABLE

| Example | Diazo component | 1st coupling component | 2nd coupling component |
|---|---|---|---|
| 6<br>$\lambda_{max}$ = 630 nm | | | |
| 7<br>$\lambda_{max}$ = 620 nm | | | |
| 8<br>$\lambda_{max}$ = 628 nm | | | |
| 9<br>$\lambda_{max}$ = 607 nm | | | |
| 10<br>$\lambda_{max}$ = 615 nm | | | |
| 11<br>$\lambda_{max}$ = 625 nm | | | |

| Example | Diazo component | 1st coupling component | 2nd coupling component |
|---|---|---|---|
| 12 $\lambda_{max}$ = 621 nm | | | |
| 13 $\lambda_{max}$ = 604 nm | | | |
| 14 $\lambda_{max}$ = 619 nm | | | |
| 15 $\lambda_{max}$ = 620 nm | | | |
| 16 $\lambda_{max}$ = 608 nm | | | |
| 17 $\lambda_{max}$ = 615 nm | | | |
| 18 $\lambda_{max}$ = 622 nm | | | |
| 19 $\lambda_{max}$ = 584 nm | | | |
I claim:
1. A dyestuff of the formula (I)
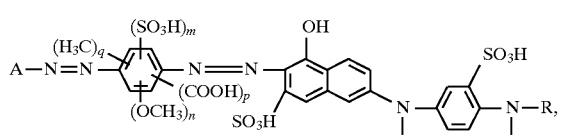
in which
A represents a radical of the formulae
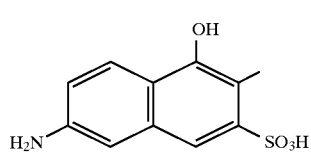

-continued

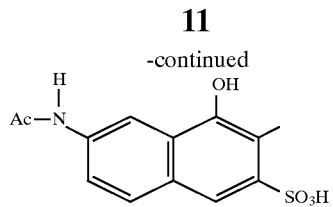 (III)

in which

Ac represents an acetyl or propionyl radical or a benzoyl radical which is optionally substituted by $CH_3$, $CH_3O$ or COOH, m, n, p and q represent 0 or 1 and m+p=1, and R represents hydrogen or a benzoyl radical which is optionally substituted by $CH_3$, $CH_3O$ or COOH, with the proviso that R≠hydrogen if m=1 and n=0 and q=0.

2. A dyestuff as claimed in claim 1, in which

A represents a radical of the formula

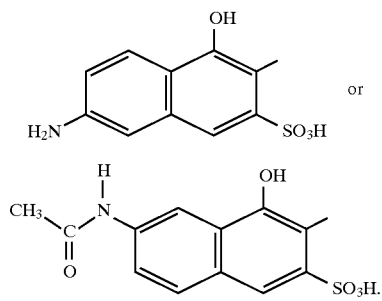

3. A dyestuff as claimed in claim 1, of the formulae

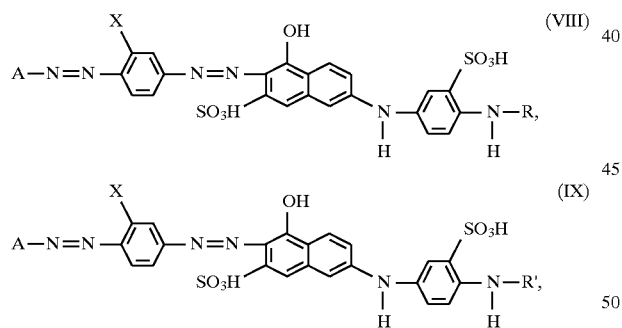

in which

A represents a radical of the formula (II) or (VII) as claimed in claim 2,

X represents $SO_3H$ or COOH,

R' represents benzoyl which is optionally substituted by $CH_3$, $CH_3O$ or COOH and R has the meaning given in claim 1.

4. A dyestuff as claimed in claim 3, in which R and R' represent

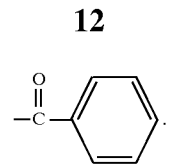

5. A process for the preparation of a dyestuff as claimed in claim 1, which comprises coupling the compound of the general formula (IV)

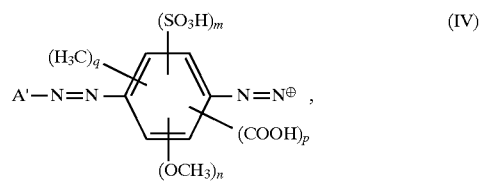

in which A' represents a radical of the formula

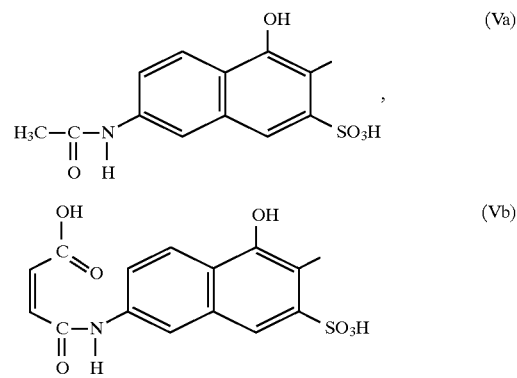

in which
Ac, m, n, p and q have the meaning given in claim 1, with a compound of the formula (VI)

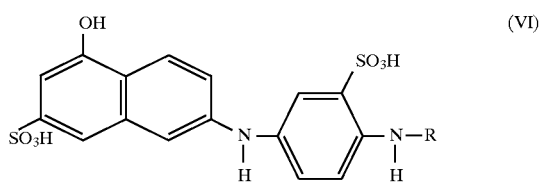

in which
R has the meaning given in claim 1,
and then splitting off the maleyl radical or acetyl radical selectively.

6. A method of dyeing cellulosic materials which comprises applying thereto a dyestuff of claim 1.

7. A method according to claim 6 wherein the cellulosic material is paper.

8. Cellulosic materials dyed with a dyestuff as claimed in claim 1.

9. Cellulosic material of claim 8 which is paper.

* * * * *